F. M. GARDNER.
Lifting Attachment for Shovels and Forks.
No. 161,678. Patented April 6, 1875.
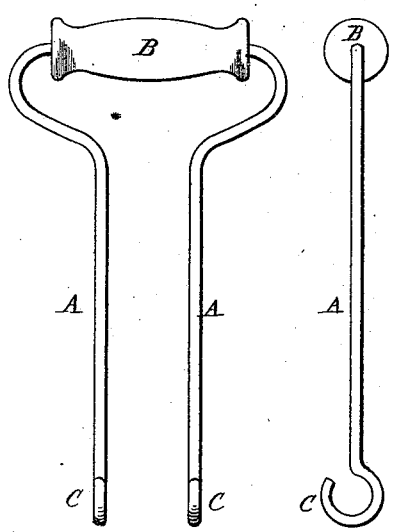
Fig. 1.
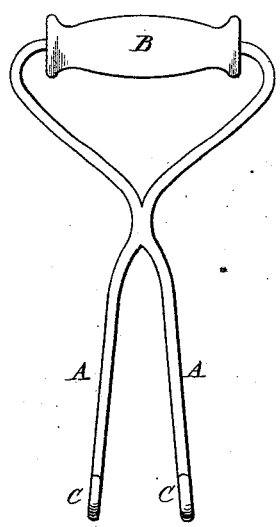
Fig. 2.
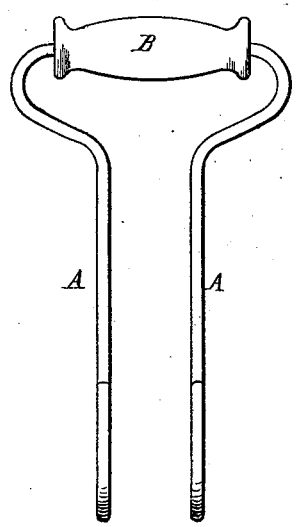
Fig. 3.
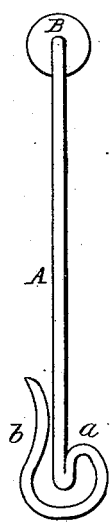
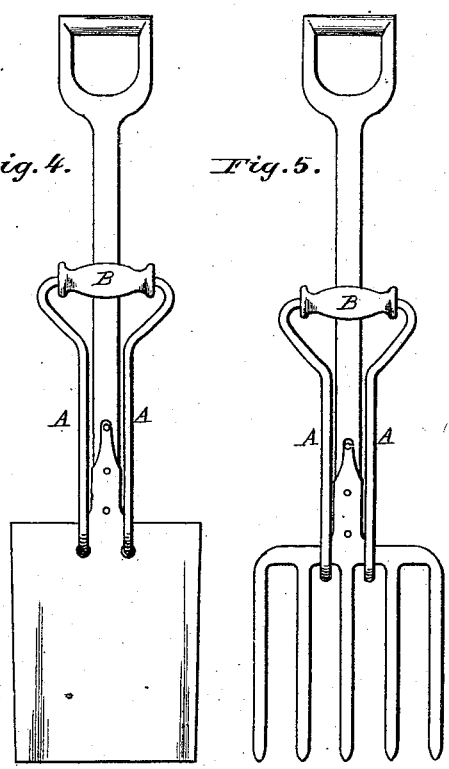
Fig. 4. Fig. 5.
Attest:
Jo. L. Coombs
Geo. W. Cushing
Inventor.
Francis M. Gardner
By James L. Norris, atty
THE GRAPHIC CO.PHOTO-LITH.39 & 41 PARK PLACE, N.Y.

UNITED STATES PATENT OFFICE.

FRANCIS M. GARDNER, OF HORNELLSVILLE, NEW YORK.

IMPROVEMENT IN LIFTING ATTACHMENTS FOR SHOVELS AND FORKS.

Specification forming part of Letters Patent No. 161,678, dated April 6, 1875; application filed March 31, 1875.

*To all whom it may concern:*

Be it known that I, FRANCIS M. GARDNER, of Hornellsville, in the county of Steuben and State of New York, have invented certain new and useful Improvements in Lifting Attachment for Shovels, Pitch-Forks, &c., of which the following is a specification:

This invention relates to certain improvements in that class of shovels or forks wherein is provided a supplementary handle attachment, constructed so that the operator is enabled to stand in an erect position while using the implement to which the handle is applied; said handle serving to facilitate the introduction and removal of a shovel or fork into and from the substance into which they are entered, as it can be conveniently grasped and held at any desired angle in respect to the handle or stock proper of the implement.

In such as heretofore constructed and alluded to, the supplementary handle has either been connected with the handle of the shovel or fork, or else such handle has been connected with the sides of a scoop near its front end, the scoop being provided with the usual bail-handle at its rear end.

My invention, as aforementioned, is to improve upon such, and consists in a supplementary handle comprising two arms or branches, which are connected at their upper ends to form a hand-hold, or to receive a wooden handle, and provided at their lower ends with hooks, which are designed to enter openings in the blade of a shovel or spade plate at the sides of the handle proper, or to embrace the top connecting-bar or head of a pitch-fork, by which means the supplementary handle attachment can be attached and detached at will, the construction and arrangement being such that the main handle will be between the arms of the supplementary handle, and by connecting the supplementary handle directly with the blade of the shovel or cross-bar of a pitch-fork, the main handle will be relieved of the strain usually exerted upon such when the supplementary handle is connected therewith.

In the accompanying drawings, Figure 1 represents a handle attachment having two arms, which are disconnected, so as to enable the same to be sprung laterally to a suitable extent. Fig. 2 represents a pair of connected arms having a top handle and hooked ends, the same as in Fig. 1. Fig. 3 illustrates a handle attachment having long spring-hooks for attaching purposes. Fig. 4 represents a handle applied to a shovel, and Fig. 5 shows one attached to a pitch-fork.

The handle attachment is made of a bail form, and consists of two arms or branches, A, which are connected at the top by bending the metal of the arms horizontally thereat. The top portion of the handle attachment is enlarged laterally, so as to form a hand-loop, and to enable a wooden or other handle, B, to be applied to the same. From thence the arms A are brought so close together as will cause the same to be located on opposite sides of the permanent handle, to which the supplementary handle is applied. The lower ends of the branches or arms A are bent to form hooks C, which are designed to be entered through openings formed near the top edge of a shovel or spade plate, as shown in Fig. 4, or to embrace the top bar of a pitch-fork, as seen in Fig. 5.

The hooks may be of a nearly circular form, as represented in Figs. 1, 2, and 4, or they may be formed by bending the metal first upwardly on one side of the arms, as seen at *a*, and then from the top of the bend so formed around the other sides of the arms, and in an upward direction, to such an extent as will form long hooks *b*.

A handle provided with attaching-hooks of the latter description is especially adapted for forks and implements having cross-bars, as the hooks will spring sufficiently to enable the handle to be applied, after which they will close to prevent the disengagement of the connected parts.

The space between the bend *a* and the curved portion of the hook receives the cross-bar of the fork or other article when force is applied to the handle.

It will be perceived that a handle constructed and applied as shown will enable the manipulator of a spade or fork to stand in an erect position both in introducing and removing the same from the ground or other object.

The supplementary handle is disposed in such relation to the permanent handle of an implement that the permanent or main handle will be between the arms of the supplementary handle, and is of such a size relatively thereto that the manipulation of implements of the specified character is greatly facilitated, as considerable more force can be applied in introducing the implement into the ground or in removing it therefrom.

The supplementary handle is free to swing in an outward direction from the permanent handle, and it is at all times ready for use, its hand-hold resting upon the handle to which it is applied.

Having thus described my invention, what I claim as new, and desire to secure by Letters Patent, is—

A lifting attachment consisting of two arms and a handle, each arm provided with a hook for attaching and detaching at will, with the blade of an ordinary shovel or cross-bar or head of a pitch-fork upon each side of the main rigid handle, substantially as described.

In testimony that I claim the foregoing, I have hereunto set my hand.

FRANCIS M. GARDNER.

Witnesses:
  JOS. S. COOMBS,
  JAMES L. NORRIS.